(12) United States Patent
Szetu et al.

(10) Patent No.: US 8,364,749 B2
(45) Date of Patent: Jan. 29, 2013

(54) COLLABORATIVE TAGGING SYSTEMS AND METHODS FOR RESOURCES

(75) Inventors: Jay Szetu, Taipei (TW); Wen-Tai Hsieh, Taipei (TW); Wei-Shen Lai, Taipei (TW); Han-Chao Lee, Taipei (TW); Seng-cho T. Chou, Taipei (TW); Yen-Lin Chen, Taipei County (TW)

(73) Assignee: Institute for Information Industry, Taipei (TW)

( * ) Notice: Subject to any disclaimer, the term of this patent is extended or adjusted under 35 U.S.C. 154(b) by 930 days.

(21) Appl. No.: 12/003,632

(22) Filed: Dec. 28, 2007

(65) Prior Publication Data

US 2009/0164584 A1 Jun. 25, 2009

(30) Foreign Application Priority Data

Dec. 20, 2007 (TW) .............................. 96148909 A

(51) Int. Cl.
*G06F 15/16* (2006.01)
(52) U.S. Cl. ...................... 709/203; 709/205; 709/223
(58) Field of Classification Search .................. 709/205, 709/223
See application file for complete search history.

(56) References Cited

U.S. PATENT DOCUMENTS

| 5,533,189 | A * | 7/1996 | Cheong et al. ............... 714/6.24 |
| 6,564,246 | B1 * | 5/2003 | Varma et al. ................... 709/205 |
| 2003/0126561 | A1 * | 7/2003 | Woehler et al. ............... 715/531 |
| 2007/0043583 | A1 * | 2/2007 | Davulcu et al. .................... 705/1 |
| 2007/0043688 | A1 * | 2/2007 | Kountz et al. ..................... 707/1 |
| 2007/0226077 | A1 * | 9/2007 | Frank et al. ...................... 705/27 |
| 2008/0114644 | A1 * | 5/2008 | Frank et al. ...................... 705/14 |
| 2010/0241711 | A1 * | 9/2010 | Ansari et al. .................. 709/205 |

FOREIGN PATENT DOCUMENTS

| JP | 2004-326150 A | 11/2004 |
| JP | 2005-275505 A | 10/2005 |
| TW | 200611139 | 4/2006 |

OTHER PUBLICATIONS

Peter Mika "Ontologies are us: A unified model of social networks and semantics" Journal of Web Semantics. Feb. 2007. vol. 5, No. 1, pp. 5-15. (http://research.yahoo.com/pub/1151).
Shigeru Fujimura et al., "Similarity scoring between Blog Tags" Letters of the Database Society of Japan, Mar. 2007. vol. 5 No. 4, pp. 33-36.

* cited by examiner

*Primary Examiner* — Patrice Winder
*Assistant Examiner* — Tauqir Hussain
(74) *Attorney, Agent, or Firm* — Birch, Stewart, Kolasch & Birch, LLP

(57) ABSTRACT

Collaborative tagging systems and methods for resources are provided. The system comprises a first client and a tagging index server. The first client extracts at least one first resource characteristic of a first resource, wherein the first resource characteristic comprises at least a first tag. The tagging index server receives the first resource characteristic of the first resource from the first client via a network. The tagging index server performs a content based comparison according to the first resource characteristic and at least one second resource characteristic of a second resource, and determines whether to establish an association between the first tag and at least one second tag of the second resource characteristic according to a result of the content based comparison.

16 Claims, 6 Drawing Sheets

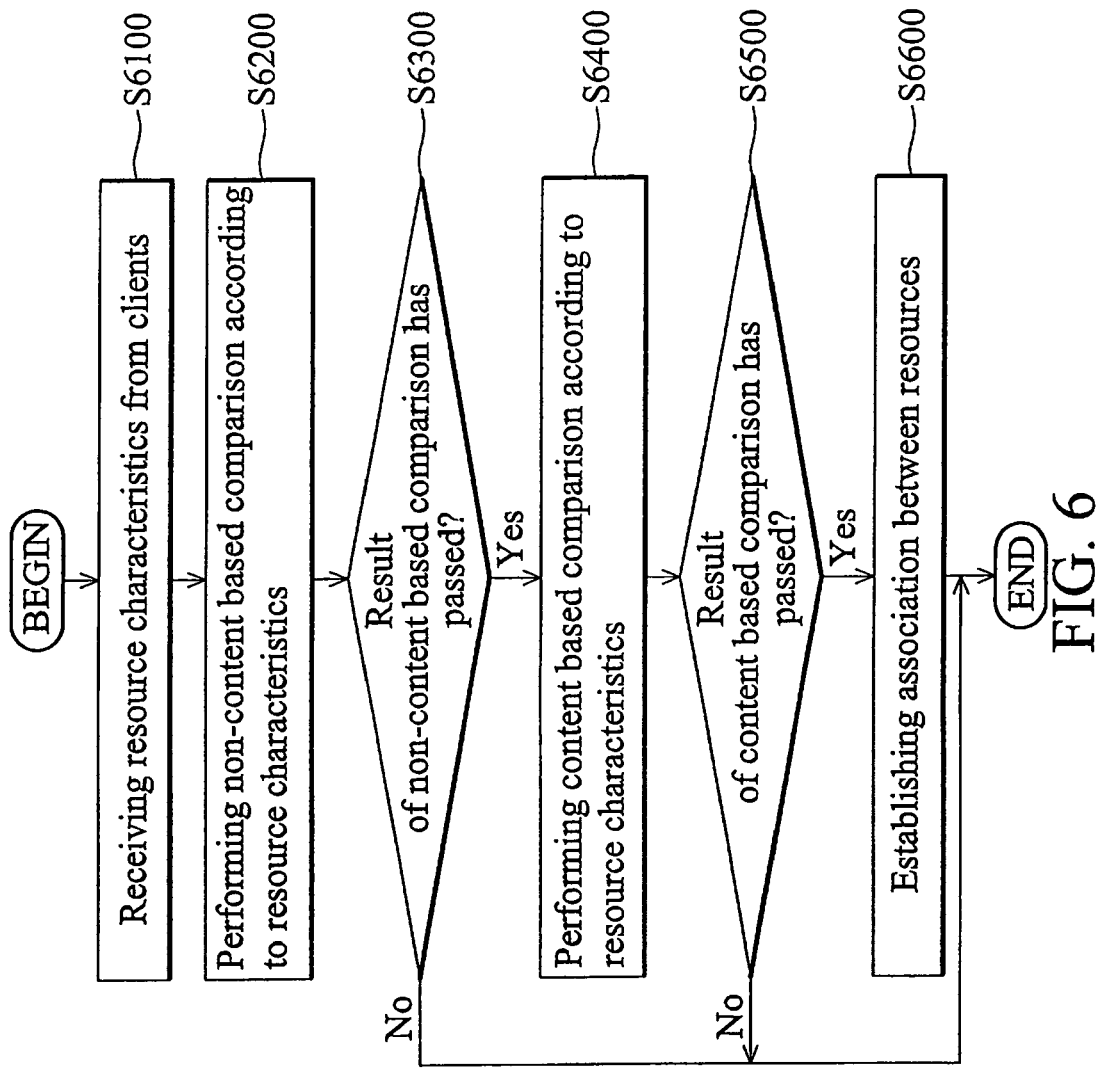

COLLABORATIVE TAGGING SYSTEMS AND METHODS FOR RESOURCES

BACKGROUND OF THE INVENTION

1. Field of the Invention

The disclosure relates generally to collaborative tagging systems and methods for resources, and, more particularly to collaborative tagging systems and methods for resources that share client resources to a network.

2. Description of the Related Art

In a network environment, a resource has a URL (Universal Resource Locator) to represent its location on the network. In a network resource tagging system, users can tag for respective network resources. The network resources can be shared by corresponding tags established by different users. Additionally, since the tags are established according to respective users' viewpoints, the effect of concept search on network resources can be achieved by searching the various tags. However, in the network resource tagging system, since the shared targets are limited to the resources in the network environment, the resources in private domains or personal computers cannot be shared.

A desktop tagging system is designed to manage the resources in a personal computer. Similarly, the desktop tagging system use tags to manage the resources, such as files (text files, image files, and/or video files) in the personal computer. Compared to traditional hierarchical data management systems, resource and/or classification name does not need to be memorized, and resources can be directly accessed via its corresponding tags in the desktop tagging system. However, other users' viewpoints cannot be referenced, and the resources cannot be shared to the network in the desktop tagging system.

BRIEF SUMMARY OF THE INVENTION

Collaborative tagging systems and methods for resources are provided. In the application, client resources can be tagged and shared to the network, and the resources and tags thereof from other clients can be referenced.

An embodiment of a collaborative tagging system for resources comprises a first client and a tagging index server. The first client extracts at least one first resource characteristic of a first resource, wherein the first resource characteristic comprises at least a first tag. The tagging index server receives the first resource characteristic of the first resource from the first client via a network. The tagging index server performs a content based comparison according to the first resource characteristic and at least one second resource characteristic of a second resource, and determines establishing of an association between the first tag and at least one second tag of the second resource characteristic according to a result of the content based comparison.

In an embodiment of a collaborative tagging method for resources, at least one first resource characteristic of a first resource is extracted by a first client, wherein the first resource characteristic comprises at least a first tag. The first resource characteristic of the first resource is transmitted from the first client to a tagging index server via a network. A content based comparison is performed according to the first resource characteristic and at least one second resource characteristic of a second resource by the tagging index server, and determination to establish an association between the first tag and at least one second tag of the second resource characteristic is according to a result of the content based comparison.

Collaborative tagging systems and methods for resources may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein:

FIG. 6 is a flowchart of an embodiment of a collaborative tagging method for resources according to the invention.

DETAILED DESCRIPTION OF THE INVENTION

Collaborative tagging systems and methods for resources are provided.

Figure 1:
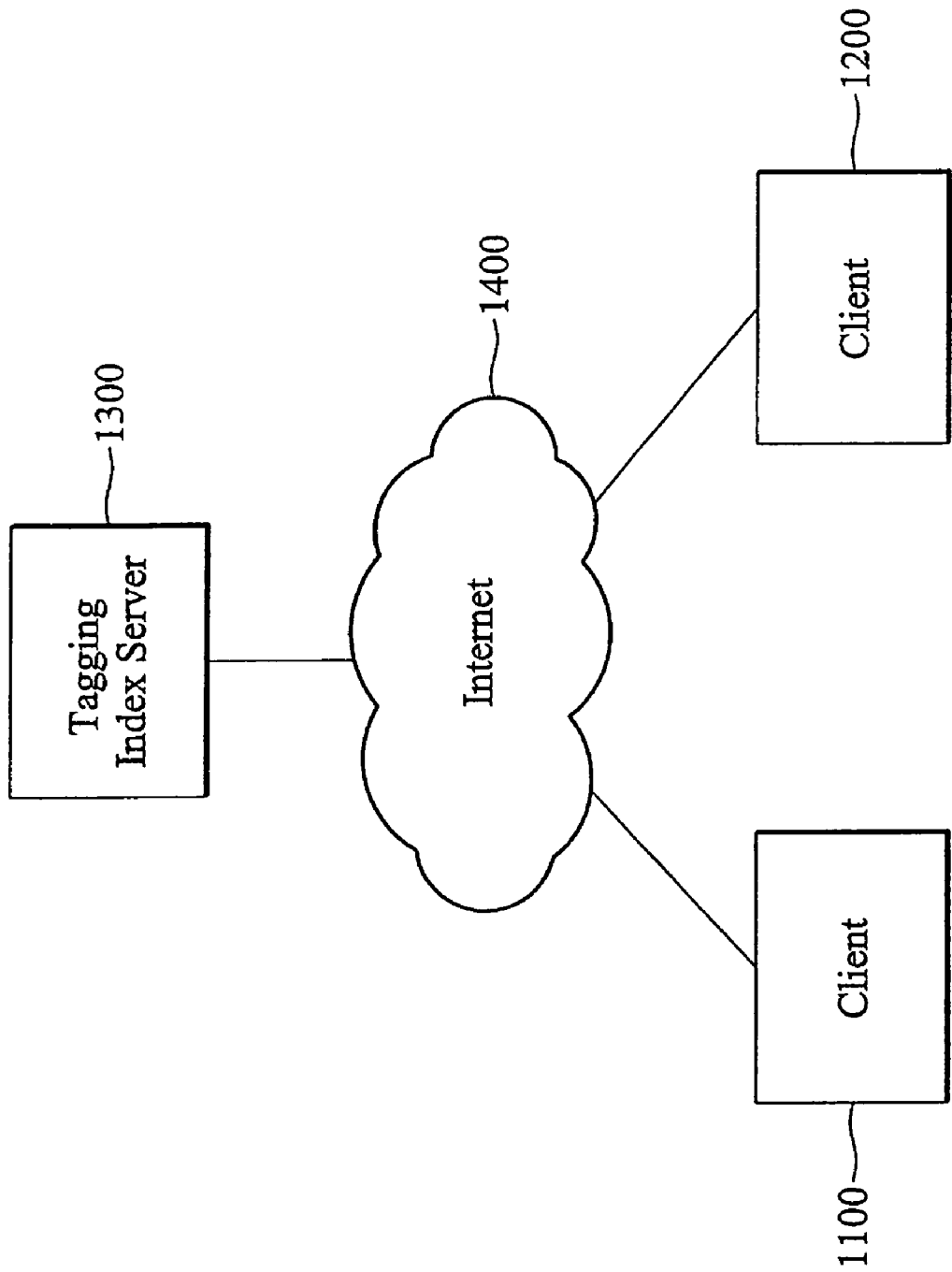
FIG. 1 is a schematic diagram illustrating an embodiment of a collaborative tagging system for resources according to the invention.

FIG. 1 is a schematic diagram illustrating an embodiment of a collaborative tagging system for resources according to the invention.

Figure 2:
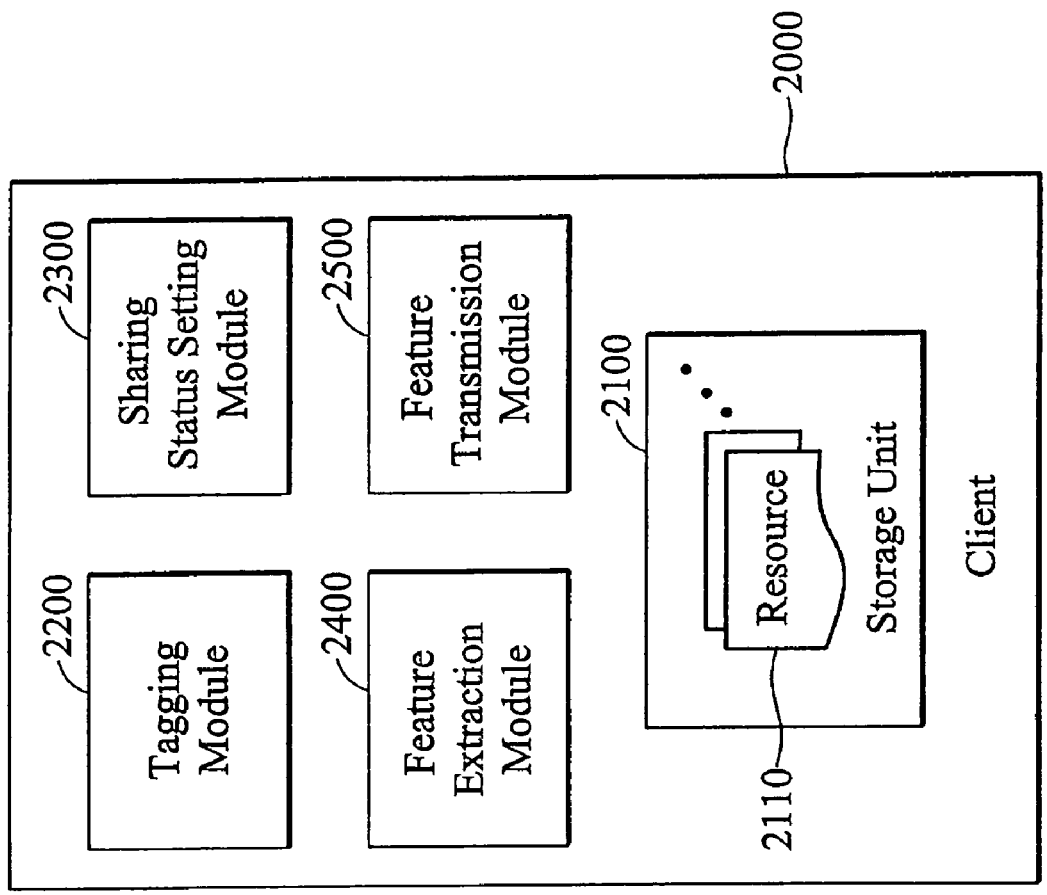
FIG. 2 is a schematic diagram illustrating an embodiment of a client according to the invention.

As shown in FIG. 1, the collaborative tagging system for resources comprises a plurality of clients 1100 and 1200, and a tagging index server 1300. The tagging index server 1300 couples to the clients via an Internet 1400. FIG. 2 is a schematic diagram illustrating an embodiment of a client according to the invention. The client 2000 comprises a storage unit 2100, a tagging module 2200, a sharing status setting module 2300, a feature extraction module 2400, and a feature transmission module 2500. The storage unit 2100 comprises at least one resource 2110, such as a file and service. At least one tag can be established for the resource 2110 via the tagging module 2200. It is understood that the tag may be a social annotation for the resource 2110. A sharing status, such as, 'stop sharing' or 'allow sharing' can be set for the resource 2110 via the sharing status setting module 2300. The feature extraction module 2400 extracts at least one resource characteristic of the resource 2110. The resource characteristic may be a keyword, key term, key sentence, hash value, creation time, author, file type, file size, and/or others. Additionally, the resource characteristic may further comprise the tags of the resource 2110. It is noted that the extracted resource characteristic may be stored in the storage unit 2100. The feature transmission module 2500 transmits the resource characteristic of the resource 2110 to the tagging index server 1300 via the Internet 1400. It is understood that the feature transmission module 2500 may first check the sharing status of the resource 2110, and transmit the resource characteristic of the resource 2110 to the tagging index server 1300 if the sharing status of the resource 2110 is 'allow sharing'. The tagging index server 1300 receives resource characteristics of resources from different clients, and determines the associations among the resources among respective clients.

Figure 3:
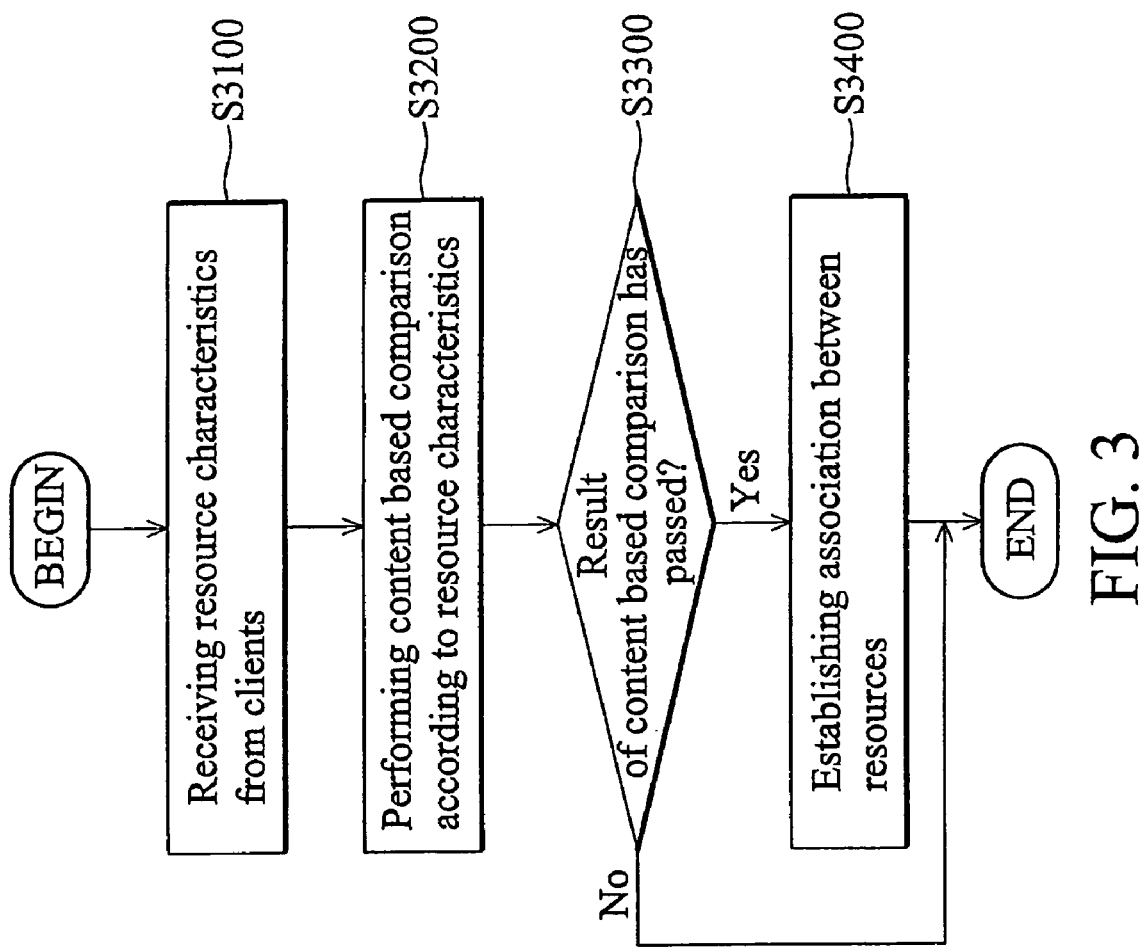
FIG. 3 is a flowchart of an embodiment of a collaborative tagging method for resources according to the invention.

FIG. 3 is a flowchart of an embodiment of a collaborative tagging method for resources according to the invention.

Figure 4:
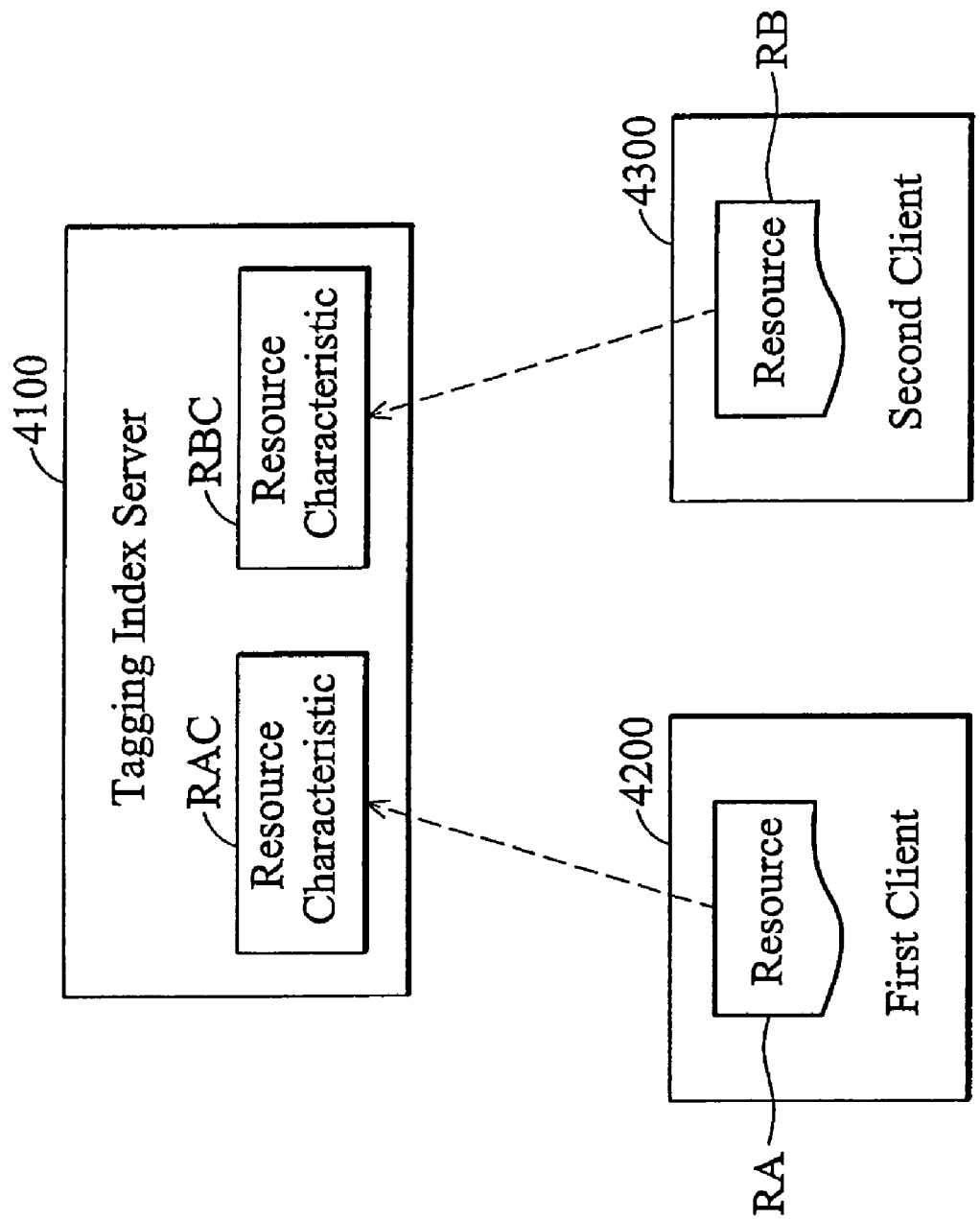
FIG. 4 is a schematic diagram illustrating an embodiment of reception of resource characteristics from clients by the tagging index server according to the invention.

In step S3100, the tagging index server receives resource characteristics of resources from different clients. For example, the tagging index server 4100 receives a resource characteristic RAC of a resource RA from a first client 4200, and receives a resource characteristic RBC of a resource RB from a second client 4300, as shown in FIG. 4. Similarly, the resource characteristic may comprise tags, keywords, key terms, key sentences, a hash value, a creation time, an author, a file type, and/or a file size of the resource. In step S3200, a content based comparison is performed for the resources in different clients according to the received resource characteristics. It is understood that the content based comparison compares the resource characteristics obtained according to the content of resources. In step S3300, it is determined whether a result of the content based comparison for the resources has passed. If not (No in step S3300), the procedure is completed. If so (Yes in step S3300), in step S3400, an association between the resources is established. It is understood that the association between the resources is established by establishing an association between the tags of the respective resources. It is noted that the association between the tags can be stored for further resource query and location.

In some embodiments, the content based comparison can use an algorithm, such as Cosine Similarity to calculate a similarity measure according to the resource characteristics of respective resources. If the similarity measure is greater than a threshold value, the result of the content based comparison is passed, and the association between the tags of different resources is established. In some embodiments, the content based comparison can calculate a percentage of words or sentences which are commonly found in respective resources according to the resource characteristics. If the percentage is greater than a predefined percentage, the result of the content based comparison is passed, and the association between the tags of different resources is established.

Figure 5:
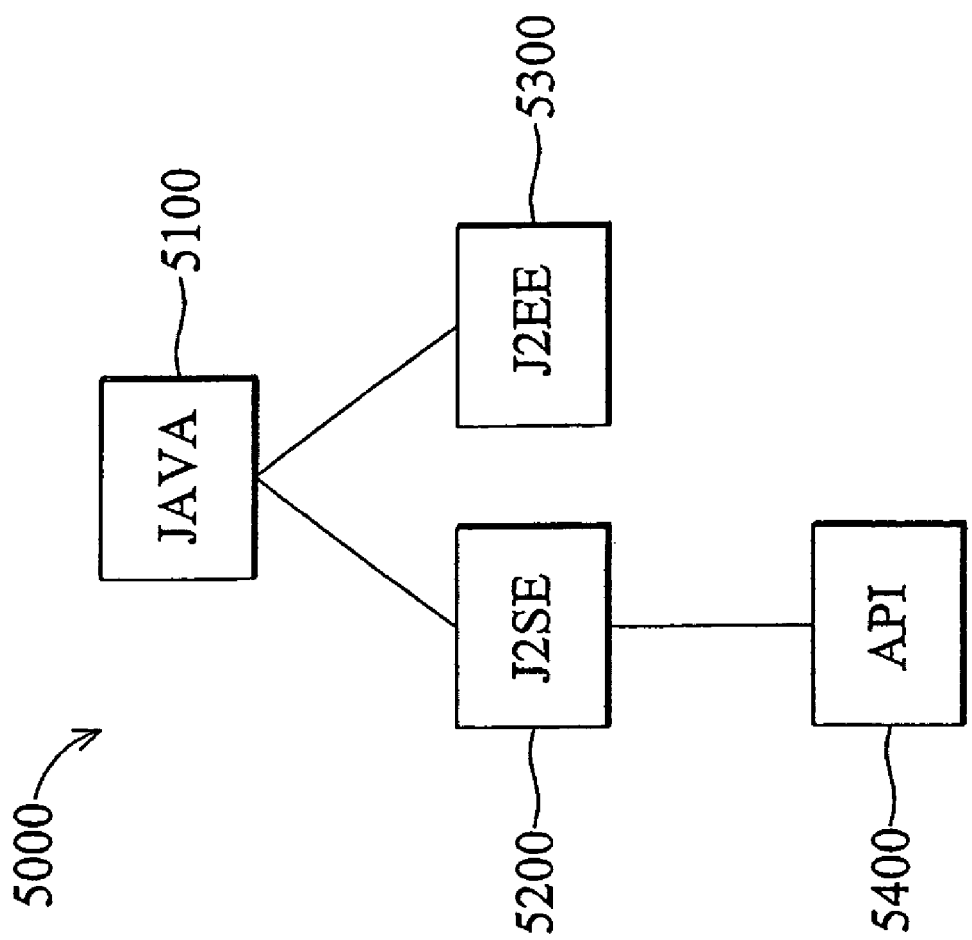
FIG. 5 is a schematic diagram illustrating an embodiment of an example of a concept space architecture for tags according to the invention.

In some embodiments, a concept space architecture for tags can be established according to the resource characteristics of resources. The concept space architecture comprises a plurality of nodes structured in a tree hierarchy. Each node may be a tag. The connection between nodes represents the association between tags. In some embodiments, a resource range, such as a tag is contained in which resource can be first determined for respective tags. Then, the tag is established as a specific node of the concept space architecture according to the resource ranges of respective tags. FIG. 5 is a schematic diagram illustrating an embodiment of an example of a concept space architecture for tags according to the invention. As shown in FIG. 5, tag 'JAVA' 5100 is a common parent node of tag 'J2SE' 5200 and tag 'J2EE' 5300. Additionally, tag 'API' 5400 is a son node of tag 'J2SE' 5200. Since the associations between tags are established, resources in different clients can be located by designating one of the tags. In the example of FIG. 5, when tag 'JAVA' 5100 is designated, the resources corresponding to tag 'J2SE' 5200 and tag 'J2EE' 5300 can be also simultaneously sought since associations exist between tag 'JAVA' 5100, and tag 'J2SE' 5200 and tag 'J2EE' 5300.

FIG. 6 is a flowchart of an embodiment of a collaborative tagging method for resources according to the invention.

In step S6100, the tagging index server receives resource characteristics of resources from different clients. Similarly, the resource characteristic may comprise tags, keywords, key terms, key sentences, a hash value, a creation time, an author, a file type, and/or a file size of the resource. In step S6200, a non-content based comparison is performed for the resources in different clients according to the received resource characteristics, and in step S6300, it is determined whether a result of the non-content based comparison for the resources has passed. It is understood that the non-content based comparison compares the file property, such as file size, file type, creation time, and/or author of resources. In some embodiments, if the file type, creation time, and/or author of resources conform to each other, the result of the non-content based comparison is passed. In some embodiments, if the difference between the file sizes of resources is less than a predefined value, the result of the non-content based comparison is passed. If the result of the non-content based comparison is not passed (No in step S6300), the procedure is completed. If the result of the non-content based comparison is passed (Yes in step S6300), in step S6400, a content based comparison is performed for the resources in different clients according to the received resource characteristics, and in step S6500, it is determined whether a result of the content based comparison for the resources has passed. Similarly, in some embodiments, the content based comparison can calculate a similarity measure according to the resource characteristics of respective resources. If the similarity measure is greater than a threshold value, the result of the content based comparison is passed. In some embodiments, the content based comparison can calculate a percentage of words or sentences which are commonly found in respective resources according to the resource characteristics. If the percentage is greater than a predefined percentage, the result of the content based comparison is passed. If the result of the content based comparison is not passed (No in step S6500), the procedure is completed. If the result of the content based comparison is passed (Yes in step S6500), in step S6600, an association between the resources is established. Similarly, the association between the resources is established by establishing an association between the tags of the respective resources. Since the associations between tags are established, resources in different clients can be located by designating one of the tags.

The collaborative tagging systems and methods for resources of the application can integrate resources in different clients, and share client resources by collaboratively tagging.

Collaborative tagging systems and methods for resources, or certain aspects or portions thereof, may take the form of a program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A collaborative tagging system for resources, comprising:
   a first client, comprising:
      a storage unit, comprising a first resource; and
      a feature extraction module, extracting at least one first resource characteristic of the first resource, and outputting the first resource characteristic of the first resource, wherein the first resource characteristic comprises at least a first tag;
   a second client, comprising:
      a storage unit, comprising a second resource; and
      a feature extraction module, extracting at least one second resource characteristic of the second resource, and outputting the second resource characteristic of the second resource wherein the second resource characteristic comprises at least a second tag; and
   a tagging index server coupled to the first client and the second client via a network, receiving the first resource characteristic of the first resource from the first client, receiving the second resource characteristic of the second resource from the second client, performing a non-content based comparison according to the first resource characteristic and the second resource characteristic, wherein the non-content based comparison compares a file property of the first resource and the second resource, when the file property of the first resource conforms to that of the second resource, performing a content based comparison according to the first resource characteristic and the second resource characteristic, and determining establishment of an association between the first tag and the second tag according to a result of the content based comparison,
   wherein when the tagging index server receives a query for the first tag or the second tag, the tagging index server simultaneously locates the first resource of the first client and the second resource of the second client according to the association between the first tag and the second tag.

2. The system of claim 1, wherein the content based comparison calculates a similarity measure according to the first resource characteristic and the second resource characteristic, wherein the association between the first tag and the second tag is established when the similarity measure is greater than a threshold value, and the first resource and the second resource is located by designating the first tag or the second tag.

3. The system of claim 1, wherein the content based comparison calculates a percentage of words or sentences which are commonly found in the first resource and the second resource according to the first resource characteristic and the second resource characteristic, wherein the association between the first tag and the second tag is established when the percentage is greater than a predefined percentage, and the first resource and the second resource is located by designating the first tag or the second tag.

4. The system of claim 3, wherein the tagging index server further establishes a concept space architecture for tags according to the result of the content based comparison, wherein the first tag and the second tag are respectively located at a specific node of the concept space architecture, and the first tag and the second tag have at least one common parent node.

5. The system of claim 1, wherein the file property comprises a file type, a creation time, or an author.

6. The system of claim 1, wherein the tagging index server further performs a non-content based comparison according to the first resource characteristic and the second resource characteristic, wherein the non-content based comparison compares a file size of the first resource and the second resource, and the content based comparison is performed when a difference of the file size between the first resource and the second resource is less than a predefined value.

7. The system of claim 1, further comprising a second client comprising the second resource, wherein the second client extracts the second resource characteristic of the second resource, and transmits the second resource characteristic to the tagging index server.

8. The system of claim 7, wherein the first client further checks a sharing status of the first resource, and transmits the first resource characteristic to the tagging index server according to the sharing status.

9. A collaborative tagging method for resources, comprising:
   extracting at least one first resource characteristic of a first resource by a first client, wherein the first resource characteristic comprises at least a first tag;
   transmitting the first resource characteristic to a tagging index server via a network by the first client;
   extracting at least one second resource characteristic of a second resource by a second client, wherein the second resource characteristic comprises at least a second tag;
   transmitting the second resource characteristic to the tagging index server via the network by the second client;
   performing a non-content based comparison according to the first resource characteristic and the second resource characteristic by the tagging index server, wherein the non-content based comparison compares a file property of the first resource and the second resource;
   when the file property of the first resource conforms to that of the second resource, performing a content based comparison according to the first resource characteristic and the second resource characteristic by the tagging index server; and
   determining establishment of an association between the first tag and the second tag according to a result of the content based comparison,
   wherein when the tagging index server receives a query for the first tag or the second tag, the tagging index server simultaneously locates the first resource of the first client and the second resource of the second client according to the association between the first tag and the second tag.

10. The method of claim 9, wherein the content based comparison calculates a similarity measure according to the first resource characteristic and the second resource characteristic, and the method establishes the association between the first tag and the second tag when the similarity measure is greater than a threshold value, wherein the first resource and the second resource is located by designating the first tag or the second tag.

11. The method of claim 9, wherein the content based comparison calculates a percentage of words or sentences which are commonly found in the first resource and the second resource according to the first resource characteristic and the second resource characteristic, and the method establishes the association between the first tag and the second tag when the percentage is greater than a predefined percentage, wherein the first resource and the second resource is located by designating the first tag or the second tag.

12. The method of claim 11, further comprising establishing a concept space architecture for tags according to the result of the content based comparison, wherein the first tag and the second tag are respectively located at a specific node of the concept space architecture, and the first tag and the second tag have at least one common parent node.

13. The method of claim 9, wherein the file property comprises a file type, a creation time, or an author.

14. The method of claim 9, further comprising:
performing a non-content based comparison according to the first resource characteristic and the second resource characteristic by the tagging index server, wherein the non-content based comparison compares a file size of the first resource and the second resource; and
performing the content based comparison when a difference of the file size between the first resource and the second resource is less than a predefined value.

15. The method of claim 9, further comprising:
extracting the second resource characteristic of the second resource by a second client; and
transmitting the second resource characteristic to the tagging index server by the second client.

16. The method of claim 15, further comprising:
checking a sharing status of the first resource by the first client; and
transmitting the first resource characteristic to the tagging index server according to the sharing status by the first client.

* * * * *